(12) United States Patent
Vion

(10) Patent No.: US 7,169,301 B2
(45) Date of Patent: Jan. 30, 2007

(54) INSTALLATION FOR WATER TREATMENT BY FLOTATION

(75) Inventor: Patrick Vion, Houilles (FR)

(73) Assignee: Degremont, Rueil-Malmaison (FR)

( * ) Notice: Subject to any disclaimer, the term of this patent is extended or adjusted under 35 U.S.C. 154(b) by 236 days.

(21) Appl. No.: 10/500,564

(22) PCT Filed: Dec. 11, 2002

(86) PCT No.: PCT/FR02/04292

§ 371 (c)(1),
(2), (4) Date: Dec. 16, 2004

(87) PCT Pub. No.: WO03/064326

PCT Pub. Date: Aug. 7, 2003

(65) Prior Publication Data

US 2005/0115881 A1    Jun. 2, 2005

(30) Foreign Application Priority Data

Jan. 30, 2002 (FR) .................................. 02 01114

(51) Int. Cl.
*C02F 1/24* (2006.01)
*C02F 1/52* (2006.01)
(52) U.S. Cl. .................... 210/221.2; 210/205; 210/206
(58) Field of Classification Search ............ 210/221.2, 210/205, 206
See application file for complete search history.

(56) References Cited

U.S. PATENT DOCUMENTS

| 4,470,903 | A | * | 9/1984 | van Leeuwen | ............... 209/168 |
|---|---|---|---|---|---|
| 4,957,633 | A | * | 9/1990 | Suutarinen | ................... 210/705 |
| 5,130,029 | A | * | 7/1992 | Suutarinen | ................... 210/703 |
| 5,382,369 | A | * | 1/1995 | Vion | ........................... 210/726 |
| 5,516,433 | A | * | 5/1996 | Suutarinen | ................... 210/703 |
| 5,766,484 | A |   | 6/1998 | Petit et al. | |

OTHER PUBLICATIONS

Experimental Studies of the Fluid Dynamics in the Separation Zone in Dissolved Air Flotation, Lundh M. et al., Water Research. vol. 34, pp. 21-30, Jan. 1, 2000.
A Multiphase CFD Model of DAF Process; Beckley et al., Water Science and Technology, vol. 43, No. 8, pp. 153-157, 2001.
Dissolved Air Flotation in Drinking Water Production; Schofield T., Water Science and Technology, vol. 43, No. 8, pp. 9-18, 2001.
Water Treatment Handbook, Berne et al., Sixth English Edition, vol. 2, pp. 679-686, 1991.

* cited by examiner

*Primary Examiner*—Thomas M. Lithgow
(74) *Attorney, Agent, or Firm*—Connolly, Bove, Lodge & Hutz LLP

(57) ABSTRACT

A water purification installation includes a coagulation area, a flocculation area, an area for mixing, in an upflow, the flocculated water with pressurised water which is delivered by a microbubble-generating pressurisation-pressure reduction system, and a flotation area. Suspended matter, which is brought to the surface by the microbubbles, is evacuated from the upper part of the flotation area. Moreover, the lower part of said flotation area includes means of collecting the clarified water. The geometry of the flotation area is such that the ratio between the height (H) of the area located above the clarified water collection means and the length (L) of the area is between 0.3 and 1; and the ratio between the surface (Sa) of the nappe at the outlet of the mixing area and the surface (Sp) of the actual flotation area is between 0.05 and 0.5 and, preferably, between 0.1 and 0.35.

7 Claims, 1 Drawing Sheet

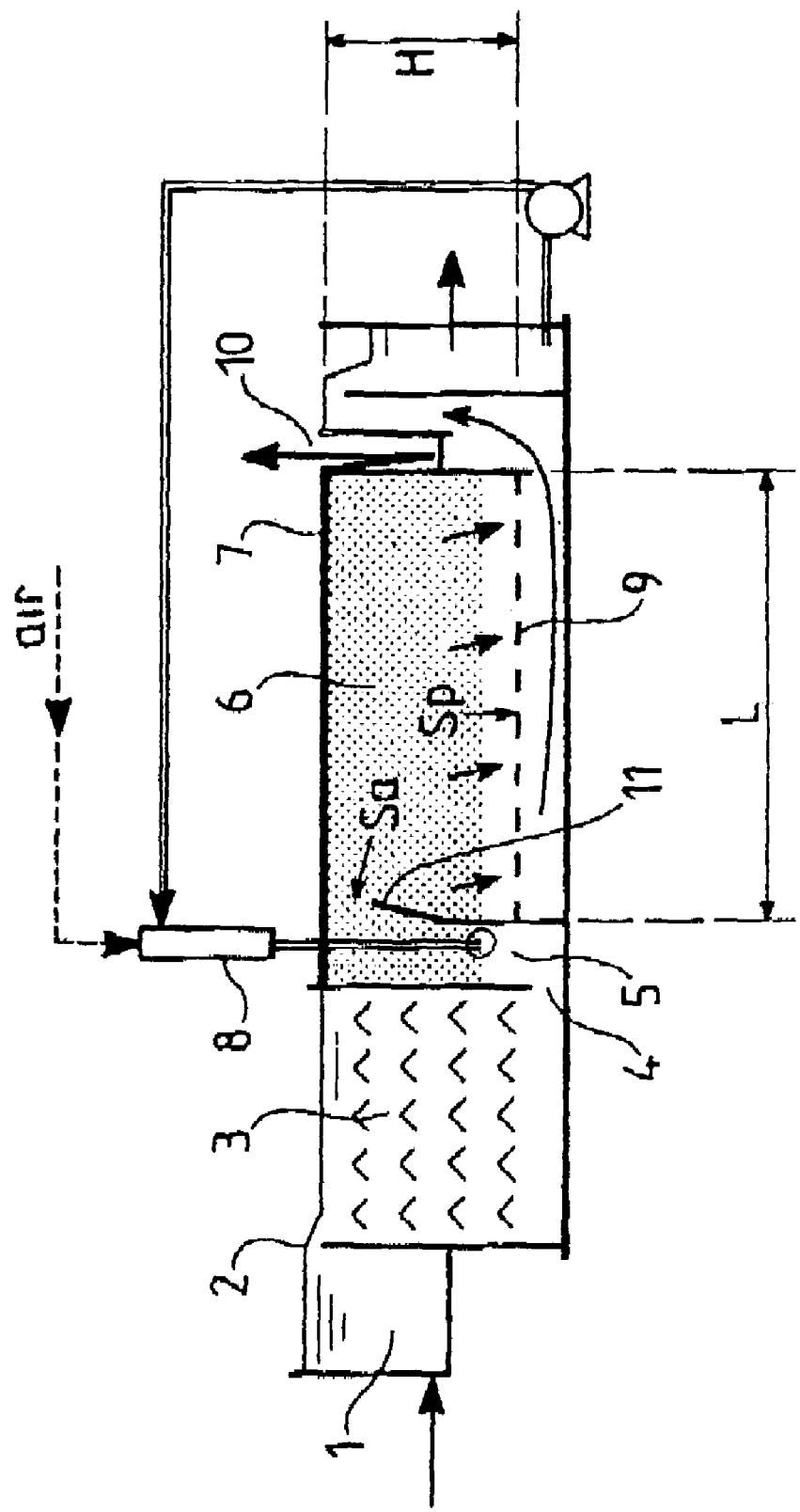
SINGLE FIG.

INSTALLATION FOR WATER TREATMENT BY FLOTATION

FIELD OF THE INVENTION

The present invention relates to an installation for water treatment comprising a flotation cell into which the raw water is allowed to pass, which raw water has, beforehand, been flocculated and then mixed with water which is pressurized and subject to pressure release such that the suspended matter contained in the raw water are entrained by the microbubbles resulting from said pressure release and discharged at the surface of the liquid contained in the cell, the treated water being discharged via the bottom of said cell.

BACKGROUND OF THE INVENTION

An installation of the type mentioned above is known (EP-A-0 659 690) which comprises a flocculation zone, a zone for mixing the flocculated raw water, in an upward current, with pressurized water delivered by a pressurization-pressure release system, and a flotation zone, in the upper part of which the suspended matter contained in the raw water and brought to the surface by the microbubbles are discharged, this flotation zone being equipped, in its lower part, with a perforated uptake device (floor with or without seal assemblies, collectors, etc.) such that the entire surface of the flotation zone exhibits a uniform and identical flow stream for the clarified liquid.

One characteristic of this type of flotation device lies in the formation of a thick bed of microbubbles by virtue of which the flocculation takes place in two stages, first of all in the flocculation zone and then within the bed of microbubbles by virtue of the large contact mass due to the microbubbles providing, moreover, the separation by flotation of the suspended matter.

One of the limitations to the use of such installations lies in the determining of the dimensions thereof. According to H. J. Kiuri, in an article entitled "Development of dissolved air flotation technology from the first generation to the newest (third) one (DAF in turbulent flow conditions)" published in "Water Science and Technology", Vol. 43, No. 8, pp 1–7, IWA Publishing 2001, a basic rule for determining the dimensions of flotation cells is that the ratio of the depth (or height H) of the flotation zone, located above the uptake system, divided by the horizontal length L between the water inlet and the opposite wall (H/L ratio) should be greater than 1. The respecting of this rule leads to the construction of installations which are very high and very expensive.

Another difficulty which became apparent during the industrial implementation of this type of installation concerns the formation of a bed of microbubbles of great height in the flotation cell (height of the bed of microbubbles often greater than 3 metres).

This height, firstly, must be greater than a minimum value to ensure good finishing of the flocculation, to optimize the attachment between the microbubbles and the flocs and also to allow the phenomena of coalescence or of agglomeration which cause the enlarging of the microbubbles and therefore the increase in their ascending velocity (30 to 60 m/h) and, secondly, it must be limited in order to reduce the depth of the structures (i.e. their height), and therefore their cost, and high supersaturations of gas. Thus, a height of 1.5 m can result in a supersaturation of +15%, while a height of 4 m can lead to a supersaturation of +40%, which constitutes a major drawback when the flotation cell is inserted upstream of a zone for treatment by filtration, for example through a bed of sand or through membranes.

Factors liable to increase the height of the bed of microbubbles are in particular as follows:

a hydraulic feed of poor quality (heterogeneous) which, for example, leads to the rate of pressurization being increased in order to increase the height of the bed of microbubbles so as to make it more stable, and a long length for the flotation cell, which brings about great heights (H/L>1 according to the prior state of the art).

BRIEF DESCRIPTION OF THE INVENTION

The present invention has set itself the aim of solving, firstly, the problem of the great depth needed to obtain the bed of microbubbles and, secondly, the problem of the stability of said bed of microbubbles, in such treatment installations.

Consequently, this invention relates to an installation for water purification comprising a coagulation zone, a flocculation zone, a zone for mixing, in an upward current, the flocculated water with pressurized water delivered by a pressurization-pressure release system, generating microbubbles, and a flotation zone, in the upper part of which the suspended matter brought to the surface by the microbubbles are discharged, this flotation zone comprising, in its lower part, a means for taking up the clarified water, this installation being characterized in that:

the geometry of the flotation zone is such that the ratio of the height of the zone located above the means for taking up the clarified water to the length of said zone is between 0.3 and 1; and the ratio of the surface area of the head of water above the outlet of the mixing zone to the surface area of the flotation zone per se is between 0.05 and 0.5, and preferably between 0.1 and 0.35.

BRIEF DESCRIPTION OF THE DRAWING

Other characteristics and advantages of the present invention will emerge from the description given below, with reference to the single figure in the attached drawing which illustrates diagrammatically an embodiment thereof given in a non-limiting capacity.

DETAILED DESCRIPTION OF THE INVENTION

As seen in the figure, the installation comprises: a coagulation zone 1 in which the raw water is mixed with a coagulant, it being possible for this coagulant, in certain cases, to be injected upstream of this zone 1; a flocculation zone 3, separated from the coagulation zone 1 by a spillway 2, a mixing zone 5 in which the flocculated raw water, introduced through a feed opening 4, is mixed, in an upward current, with microbubbles produced by a pressurization-pressure release system 8, and a flotation zone 6. The flotation zone 6 is separated from the mixing zone 5 by an inclined spillway 11. In said flotation zone 6, an accumulation of microbubbles forms, forming a thick bed in a downward current, the suspended matter in the raw water, entrained by the microbubbles, accumulating at the surface 7 so as to be discharged at 10, the clarified water being removed in the lower part of this flotation zone, after having been taken up through a floor 9, or similar means for operating at high flotation velocities.

At the inlet of the flocculation zone 3, the raw water is distributed homogeneously over the entire width of the zone, by the spillway system 2 produced, for example, in the form of continuous, crenellated, optionally branched perforated-tube spillways. This spillway/homogeneous distribution system 2 makes it possible to ensure, optionally, the introduction, and the mixing with the coagulated raw water, of (a) product(s) such as a flocculation adjuvant, the flocculation per se being provided by a static system or by horizontal rotary barriers. The combination of the distribution system 2 and the static flocculation devices or flocculators on a horizontal spindle ensures that the flotation zone is fed homogeneously over its entire width. The flocculation can also be provided by a system of, mechanical stirrer(s) on a horizontal spindle combined with calibrated orifices located at the inlet 4 of the mixing zone 5. The latter device makes it possible to re-equilibrate the flows and to compensate for the hydraulic disturbances and the rotational movements induced by stirrers on a vertical spindle.

In the mixing zone 5, the flocculated raw water is mixed with the microbubbles, generated within the pressurized water produced by the pressurization reservoir 8, in an upward current starting from the bottom of the zone, the pressure release and the formation of the microbubbles being produced by a plurality of pressurized water injection systems distributed over the entire width of the zone, this upward current being followed by a downward current as far as the uptake system. The downward flow has a velocity lower than that of the upward flow, the suspended matter entrained by the microbubbles being in large part released during the change in direction of the flow, accumulating at 7 at the surface of the flotation zone.

According to the present invention, the height of the bed of microbubbles is maintained at at least 1 metre to 1.5 m, so as to obtain the beneficial effects of the bed of microbubbles that plays the role of filter and of coalescer of said microbubbles (the bed plays the role of an accelerator of the ascending velocity of the coalesced microbubbles). The height of the flotation zone 6 must therefore be greater than 1.5 or 2 metres and, according to the invention, the ratio of the height (H) of the zone located above the uptake system 10 to the length (L) of this zone is between 0.3 and 1 (0.3<H/L<1). This characteristic, which goes against the recommendations of those skilled in the art (article by K. J. Kiuru, page 1, mentioned above), makes it possible to restrict the depth of the installations, the surface of the latter remaining constant and corresponding in general to a treatment velocity (expressed relative to the surface area Sp, i.e. the surface area of the flotation zone 6 corresponding to the length L of this zone denoted on the figure) of between 15 and 60 $m^3/m^2.h$, which has a notable effect on the construction costs for the installations. This decrease in the depth of the installations also makes it possible to avoid supersaturations of dissolved air and the effect thereof downstream of the treatment chain, in particular on sand and/or membrane filters.

According to another characteristic of this installation according to the invention, the ratio of the surface area Sa of the head of water that is located vertically above the outlet of the mixing zone 5 (i.e. the surface area of the vertical section between the upper edge of the inclined spillway 11 and the plane of water of the flotation zone 6) to the surface area Sp of the flotation zone 6 (surface area of the zone corresponding to the length L) should be between 0.05 and 0.5 (0.05<Sa/Sp<0.5), and preferably between 0.1 and 0.35 (0.1<Sa/Sp<0.35). This characteristic makes it possible to define a velocity range for the head of water vertically above the outlet of the mixing zone 5 such that the following are not exceeded:

an upper velocity limit, beyond which, firstly, a generalized rotational movement is created which disaggregates the bed of bubbles in the flotation zone 6 and entrains it into the treated effluent and, secondly, the bed of sludge 7 located at the surface of the flotation device is seriously eroded. It will be noted that an increase in the rate of pressurization, and therefore in the amount of microbubbles produced, might stabilize the bed of bubbles with, consequently, an increase in height which is relatively large, and therefore, ultimately, incompatible with the installation geometry defined by the invention;

a lower velocity limit, below which the turbulent flow conditions in the flotation zone 6 are not sufficient to ensure the formation and the stability of the bed of microbubbles, which leads to a rapid degradation of the quality of the treated water.

The system 9 for taking up the clarified water preferably consists of a floor having perforations or of tubes containing holes, as described in EP-A-0 659 690, creating a resistance to the flow through this floor which is at a maximum over the final end of the flotation zone (discharge side) and decreases in the direction of the initial end of this zone (feed side). This characteristic makes it possible to set up turbulent flow conditions within the flotation zone, which promotes the production of a stable and sufficiently thick bed of microbubbles, allowing a high treatment velocity.

These dimension determining characteristics make it possible, surprisingly for those skilled in the art, to attain treatment velocities which can range from 15 to 60 m/h, with "flat" devices (H/L ratio of between 0.3 and 1).

A certain number of advantages ensue from the invention, among which mention may be made of:

the possibility of creating installations with a high treatment capacity and a limited height. Thus, for example, the invention makes it possible to produce an installation which is 7 m in length for a height of 3 m (instead of a height of 7 m or more as recommended in the prior state of the art);

the height limitation in the dimensions of the installation result, firstly, in a decrease in construction costs and, secondly, in a limitation of dissolved gas supersaturations harmful to the filtration systems located downstream of the flotation zone.

In the example mentioned above, the adopting of a height limited to 3 metres considerably reduces the supersaturation of the clarified water, since it can be only 30% greater than the saturation dose, whereas it might reach 70% with a height of 7 m, according to the prior state of the art.

Two examples of implementation are given below, which are intended to reveal the advantage of the choice according to the invention of a ratio of Sa (surface area of the head of water located vertically above the outlet of the mixing zone 5) divided by the surface area Sp of the flotation zone 6 (i.e. the surface area of the uptake system 9) of between 0.05 and 0.5.

These examples were carried out on a pilot unit comprising a coagulator, a static-type flocculator and a flotation cell with a floor length (L) of 2.50 m and a height (H) above the floor (uptake system 9) of 3.6 m. The height of the head of water above the top of the mixing zone (Ha) was variable between 0.07 m and 1.50 m. The treatment velocity was 35 $m^3/m^2.h$. The pilot unit also comprised a circuit of pressurization at $5 \times 10^5$ Pa and of pressure release making it possible to inject a pressurized water flow rate of between 10 and 20% of the treated product. In order to simulate a hydraulic distortion, the inlet 4 of the flotation zone could be partially obstructed and, during the tests, 50% of the passage was neutralized.

These tests were carried out on river water with a relatively low content of suspended matter. The feed flow rate was regulated so as to obtain a velocity over the floor 9 of 40 m/h.

The aims of these tests were to study the hydraulic conditions required for the formation and the stability of the bed of microbubbles, and the conditions of a minimum height for this bed of microbubbles in order to maintain the stability thereof.

The two main parameters studied were the height of the head of water above the high point of the mixing zone and the possible homogeneity of the distribution upstream of this zone. The optimum percentage or content of pressurized water is approximately 10% and, to obtain stabilization, it was brought to 15 and 20%.

The criteria for quality are the formation of the bed of microbubbles, its height and, finally, the quality of the water having undergone flotation, which is expressed here by the turbidity in NTU (nephelometric turbidity unit). If the turbidity is less than 2 NTU, it is considered to be acceptable and, if it is less than 1 NTU, it can be described as excellent.

The results obtained have been specified in the form of the two tables below.

The first table illustrates the results relating to Example 1, and it shows the influence of the velocity of the head of water above the outlet of the mixing zone 5 (this outlet corresponding to a head of water having a height Ha and a surface area Sa) on the stability of the bed of bubbles and on the turbidity of the treated water.

The second table illustrates the results obtained during the implementation of Example 2, and it reveals the influence of the homogeneity of distribution upstream of the mixing zone 5, for an Sa/Sp ratio equal to 0.15.

First Series of Tests

Influence of the Velocity at the Outlet of the Mixing Zone

| Sa/Sp | Ha (m) | Y (degree of pressurization) | Bed of bubbles | Turbidity of treated water |
|---|---|---|---|---|
| 0.028 | 0.07 | 10% | No interface. Very considerable rotation. Departure of bubbles | 11 NTU |
| 0.028 | 0.07 | 20% | Idem | 7 NTU |
| 0.04 | 0.1 | 10% | Idem | 9 NTU |
| 0.04 | 0.1 | 15% | Less considerable rotation, beginning of formation of a bed, height: approximately 3.3 m | 1.8 NTU |
| 0.08 | 0.2 | 10% | Relatively unclear interface. Rotation still considerable. Poorly formed bed. Imprecise height. | 4 NTU |
| 0.08 | 0.2 | 15% | Formation of bed of bubbles. Height: approximately 2.3 m. | 1.1 NTU |
| 0.15 | 0.38 | 10% | Clear interface. Homogeneous bed. Height: 1.5 m | 0.7 NTU |

-continued

| Sa/Sp | Ha (m) | Y (degree of pressurization) | Bed of bubbles | Turbidity of treated water |
|---|---|---|---|---|
| 0.15 | 0.38 | 15% | Clear interface. Homogeneous bed. Height: 2.1 m | 0.6 NTU |
| 0.30 | 0.75 | 10% | Idem Height: 1.60 m | 0.8 NTU |
| 0.60 | 1.5 | 10% or 15% or 20% | No bed of bubbles. Departure of bubbles | 9 NTU |

The results of these tests make it possible to put forward the following conclusions:

- too high a velocity in the section of height Ha, low Sa/Sp ratio, has a tendency to cause the bed of microbubbles to rotate strongly, so preventing stabilization thereof and therefore formation thereof. However, it is possible, by increasing the degree of pressurization, to counteract this movement and to obtain a bed of bubbles. Thus, with a degree of 15%, it was possible to stabilize the bed of bubbles (4th and 6th case of the table above) but with a considerable increase in this bed of microbubbles (respectively 3.3 m and 2.3 m instead of 1.5 m);
- too low a velocity, high Sa/Sp ratio (10th case of the table), on the contrary, does not cause the minimum rotation, the turbulent flow conditions are not attained and the bed of bubbles cannot form. An excess of air is ineffective here;
- the correct Sa/Sp ratios are located within the range 0.05 and 0.5 and make it possible to have a bed of bubbles of limited height (H/L ratio<1). Outside this range, the bed of bubbles is not formed or the height of the bed of bubbles is considerable. In the 4th case of the table: bed height 3.3 m (i.e. H/L=1.32).

In the second series of tests, the results of which are given in the table below, the Sa/Sp. ratio of 0.15 was maintained. Two tests were carried out, one with a homogeneous feed provided by a spillway at the inlet of the flocculator and a static flocculation, the other by neutralizing 50% of the inlet 4 of the flotation cell (low flotation cell feed).

Second Series of Tests:

Influence of the Homogeneity of Distribution Upstream of the Mixing Zone

| Sa/Sp | Ha | Feed | Y | Bed of bubbles | Turbidity of treated water |
|---|---|---|---|---|---|
| 0.15 | 0.38 | Homogeneous over the width of the flotation device | 10% | H = 1.5 m | 0.7 NTU |
| 0.15 | | Feed over 50% of the width of the flotation device | 10% | Interface not clear. Entrainment of bubbles. | 2 NTU |
| 0.15 | | Idem | 15% | Bed of bubbles H = 3.1 | 0.9 NTU |

The results provided by these tests make it possible to put forward the following conclusions:

a feed which is not homogeneous over the width of the flotation cell does not always make it possible to form a bed of bubbles;

in the present case, it was necessary to increase the degree of pressurization. The height of the bed of bubbles is then considerable, here 3.1 m, and the H/L ratio for the flotation cell would be greater than 1, and a homogeneous feed is necessary in order to obtain beds of bubbles which are low in height.

It remains, of course, that the present invention is not limited to the examples of implementation described and represented above, but that it encompasses all the variants thereof.

The invention claimed is:

1. Installation for water purification comprising a coagulation zone (1), a flocculation zone, a spillway baffle defining a zone for mixing having an upwardly open outlet, in an upward current, the flocculated water with pressurized water delivered by a pressurization-pressure release system, generating microbubbles, and means defining a flotation zone, in the upper part of which the suspended matter brought to the surface by the microbubbles is discharged, this flotation zone means comprising, a means for taking up the clarified water, located in the base of the flotation zone wherein:

the geometry of the flotation zone means is such that the ratio of the height (H) of the zone as defined by the distance above the means for taking up clarified water to the top of the zone means to the length (L) of said zone means as defined by the distance between the spiliway baffle and the means for taking up clarified water at the base of the flotation zone between 0.3 and 1; and the ratio of the surface area (Sa) of the head of water above the outlet of the mixing zone to the surface area (Sp) of the flotation zone per se is between 0.05 and 0.5 between 0.1.

2. Installation according to claim 1, further comprising means designed so as to homogeneously distribute the raw water coagulated in the coagulation zone, over the entire width of the flocculation zone.

3. Installation according to claim 2, wherein the homogenization and the flocculation are provided by a static flocculation system.

4. Installation according to claim 1, characterized in that the homogenization and the flocculation are provided by horizontal rotary barriers.

5. Installation according to claim 2, wherein the homogenization and the flocculation are provided by a system of mechanical stirrers on a vertical spindle, calibrated orifices being provided for at the inlet of the mixing zone.

6. Installation according to claim 2, wherein the means providing the homogeneous distribution of the raw water over the entire width of the flocculation zone are produced in the form of continuous, crenellated, optionally branched perforated-tube spillways.

7. Installation according to claim 1, wherein the system for taking up the clarified water at the base of the flotation zone consists of an intermediate floor with perforations, or of tubes containing holes, setting up turbulent flow conditions within the flotation zone.

* * * * *